US012617293B2

(12) United States Patent     (10) Patent No.:   US 12,617,293 B2

Yoon et al.     (45) Date of Patent:     May 5, 2026

(54) ARTICLE TRANSPORT VEHICLE WITH POWER OPERATION FUNCTION, ARTICLE TRANSPORT SYSTEM, AND METHOD FOR OPERATION OF ARTICLE TRANSPORT VEHICLE

(71) Applicant: SEMES CO., LTD., Cheonan-si (KR)

(72) Inventors: Ki Sub Yoon, Suwon-si (KR); Ji Yoon Jung, Ansan-si (KR)

(73) Assignee: SEMES CO., LTD., Cheonan-si (KR)

( * ) Notice: Subject to any disclaimer, the term of this patent is extended or adjusted under 35 U.S.C. 154(b) by 166 days.

(21) Appl. No.: 18/083,614

(22) Filed: Dec. 19, 2022

(65) Prior Publication Data

US 2023/0191920 A1    Jun. 22, 2023

(30) Foreign Application Priority Data

Dec. 21, 2021    (KR) ........................ 10-2021-0183773

(51) Int. Cl.
   *B60L 15/20*      (2006.01)
   *B60L 50/40*      (2019.01)
   *B60L 53/14*      (2019.01)

(52) U.S. Cl.
   CPC ........... *B60L 15/2045* (2013.01); *B60L 50/40* (2019.02); *B60L 53/14* (2019.02); *B60L 2240/12* (2013.01); *B60L 2240/14* (2013.01); *B60L 2240/54* (2013.01); *B60L 2240/545* (2013.01); *B60L 2240/60* (2013.01)

(58) Field of Classification Search
   CPC .......... B60L 58/24; B60L 53/65; B60L 58/25;

B60L 53/20; B60L 50/40; H01M 10/052; B61B 3/02; H02J 7/007; H02M 3/33584; F02N 11/087; G06F 3/016; G01R 31/007

See application file for complete search history.

(56) References Cited

U.S. PATENT DOCUMENTS

| | | | | |
|---|---|---|---|---|
| 6,205,036 | B1 * | 3/2001 | Anzawa | ........... H02M 3/33584 |
| | | | | 363/20 |
| 9,430,950 | B2 | 8/2016 | Hayashi | |
| 9,902,404 | B2 | 2/2018 | Wada | |
| 10,919,399 | B2 | 2/2021 | Kotani et al. | |
| 11,271,411 | B2 * | 3/2022 | Chen | ................... H01M 10/052 |
| 2014/0172196 | A1 * | 6/2014 | Hayashi | ................. B60L 53/65 |
| | | | | 701/2 |
| 2016/0118902 | A1 * | 4/2016 | Huang | .................... B60L 58/25 |
| | | | | 363/21.04 |
| 2017/0008700 | A1 * | 1/2017 | Wada | ........................ B61B 3/02 |

(Continued)

FOREIGN PATENT DOCUMENTS

| | | | | |
|---|---|---|---|---|
| EP | 3243691 | A1 * | 11/2017 | .............. B60L 50/40 |
| JP | 2012-038134 | | 2/2012 | |

(Continued)

*Primary Examiner* — Yuri Kan

(57) ABSTRACT

Proposed are an article transport vehicle with a power operation function, an article transport system, and a method for operation of an article transport vehicle. More particularly, proposed is a technology that controls a traveling state and power operation of an article transport vehicle for each situation according to a traveling condition suitable for an energy storage means selected and mounted according to the requirements of an article transport system, thereby improving the operational efficiency of the entire article transport system.

18 Claims, 11 Drawing Sheets

(56) References Cited

U.S. PATENT DOCUMENTS

2017/0310123  A1*  10/2017  Kano ...................... H02J 7/007
2017/0326995  A1*  11/2017  Kotani ................... B60L 53/20
2018/0229116  A1*   8/2018  Rihn ...................... G06F 3/016
2018/0316205  A1*  11/2018  Lin ....................... F02N 11/087
2022/0187376  A1*   6/2022  Simonis .............. G01R 31/007

FOREIGN PATENT DOCUMENTS

JP          2018-170904        11/2018
KR      10-2017-0007115         1/2017
KR          20170007115  A   *  1/2017  .............. B61B 3/02
KR      10-2017-0128091        11/2017
KR          10-2173130         11/2020

* cited by examiner

FIG. 3A

Clean Sheet

Clean Sheet control means ~110 energy storage means setting unit ~111 traveling condition determination unit ~113 operation state control unit ~115 determining type of energy storage means ~S110 determining traveling condition information ~S130 controlling traveling state and
power operation on basis of traveling condition ~S150 executing command ~S170

ARTICLE TRANSPORT VEHICLE WITH POWER OPERATION FUNCTION, ARTICLE TRANSPORT SYSTEM, AND METHOD FOR OPERATION OF ARTICLE TRANSPORT VEHICLE

CROSS REFERENCE TO RELATED APPLICATION

The present application claims priority to Korean Patent Application No. 10-2021-0183773, filed Dec. 21, 2021, the entire contents of which is incorporated by reference herein for all purposes.

BACKGROUND OF THE INVENTION

Field of the Invention

The present disclosure relates generally to an article transport vehicle with a power operation function, an article transport system, and a method for operation of an article transport vehicle. More particularly, the present disclosure relates to a technology that controls a traveling state and power operation of an article transport vehicle for each situation according to a traveling condition suitable for an energy storage means selected and mounted according to the requirements of an article transport system, thereby improving the operational efficiency of the entire article transport system.

Description of the Related Art

In semiconductor manufacturing, a variety of numerous processes are performed to yield the final product, and hundreds of thousands of article transports occur in the process of performing the semiconductor manufacturing process. To prevent contamination and damage to semiconductor materials and delivery accidents during the article transport process, an overhead hoist transport (OHT) is utilized as an automated transport system on the semiconductor manufacturing line. The OHT is a system that automates article transport between numerous semiconductor processes. An OHT vehicle transports wafers contained in a front opening unified pod (FOUP) to manufacturing equipment for each manufacturing process along a rail installed on the ceiling.

FIG. 1 illustrates a block diagram illustrating power operation of an OHT vehicle according to the related art.

The OHT vehicle 10 is operated in such a way that a power receiving unit 13 receives power in a non-contact manner through a power feeding line on the rail, a power storage unit 12 configured as a capacitor is provided, and driving power is provided to a driving unit 15 through the control of a power control unit 11.

The power operation of the OHT vehicle 10 depends on a predetermined capacitor capacity of the power storage unit 12, so there is a problem in that it is impossible to control power output.

In particular, the output of the OHT vehicle needs to be controlled according to various factors such as the specification of an article transport system to which the OHT vehicle is applied, the amount of articles loaded in the OHT vehicle, and different speeds required for each rail section. However, there is a problem in that power operation cannot be properly controlled according to various situations in terms of the configuration of power operation of the OHT vehicle.

Furthermore, an article transport automation system can be configured by connecting ports between numerous semiconductor process equipment through a rail network. When designing such a rail network, there may be an area where a power feeding rail cannot be constructed depending on situations. However, since the conventional OHT vehicle cannot operate on a non-power feeding rail in terms of the power operation, there is a problem in that the rail network has to be designed so that the vehicle bypasses around the area where the power feeding rail cannot be constructed.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure provides a method that selectively applies various types of energy storage means according to the requirements of an article transport system, and controls power operation of an article transport vehicle, such as OHT vehicle, in consideration of the energy storage means, thereby improving the operational efficiency of the entire article transport system.

In particular, the present disclosure is intended to solve the problem in which when the output of an OHT vehicle needs to be controlled according to various factors such as the specification of an article transport system to which the OHT vehicle is applied, the amount of articles loaded in the OHT vehicle, and different speeds required for each rail section, power operation cannot be properly controlled according to various situations in terms of the configuration of power operation of the OHT vehicle.

The objectives of the present disclosure are not limited to those mentioned above, and other objectives not mentioned will be clearly understood by those skilled in the art from the following description.

In order to achieve the above objectives, according to one aspect of the present disclosure, there is provided a method for operation of an article transport vehicle in which an energy storage means selected according to requirements of an article transport system among different types of energy storage means is mounted, the method including: an energy storage means type determination step of determining a type of the energy storage means mounted in the article transport vehicle; a traveling condition information determination step of determining traveling condition information corresponding to the energy storage means mounted in the article transport vehicle among traveling condition information differently set for each type of the energy storage means; and a traveling state control step of controlling a traveling state and power operation of the article transport vehicle on the basis of the traveling condition information.

As an example, the traveling condition information determination step may include: a step of determining a capacity of a capacitor included in the energy storage means; and a step of determining traveling condition information corresponding to the capacity of the capacitor, and the traveling state control step may be performed by controlling a maximum traveling speed, acceleration and, deceleration of the article transport vehicle on the basis of the traveling condition information set corresponding to the capacity of the capacitor.

As another example, the traveling condition information determination step may include: a step of measuring an amount of remaining energy in a battery included in the energy storage means; and a step of determining traveling condition information corresponding to the measured amount of remaining energy, and the traveling state control step may be performed by controlling a maximum traveling speed, acceleration and deceleration of the article transport vehicle based on traveling condition information set corresponding to the amount of remaining energy.

Furthermore, the traveling state control step may further include: a non-power feeding section determination step of determining whether the article transport vehicle is expected to enter a non-power feeding section on a travel route having a power feeding section and the non-power feeding section; and a non-power feeding section entry determination step of determining whether to allow the article transport vehicle to enter the non-power feeding section on the basis of the measured amount of remaining energy.

Moreover, the traveling state control step may further include a preceding vehicle determination step of determining whether to allow the article transport vehicle to enter the non-power feeding section on the basis of whether a preceding article transport vehicle exists in the non-power feeding section on the travel route.

In some embodiments, the traveling state control step may further include a charging maintenance step of maintaining charging in the power feeding section when it is determined that the article transport vehicle is not allowed to enter the non-power feeding section.

Alternatively, the non-power feeding section entry determination step may include: a step of reporting a non-entry situation to a higher-level management device when it is determined that the article transport vehicle is not allowed to enter the non-power feeding section; and a step of receiving a travel route changed to the power feeding section from the higher-level management device.

As an example, the traveling state control step may further include: a maintenance area allocation step of comparing a lifespan of the battery with a reference value, reporting a battery replacement situation to a higher-level management device when it is necessary to replace the battery, and allocating a transport vehicle maintenance area from the higher-level management device; and a maintenance area route traveling step of traveling the article transport vehicle to the allocated transport vehicle maintenance area on the basis of traveling condition information set corresponding to the battery replacement situation.

In some embodiments, the traveling state control step may further include a charging step of performing charging through a rail while the article transport vehicle travels in a power feeding section on a travel route having the power feeding section and a non-power feeding section.

As an example, the charging step may be performed by performing the charging according to charging condition information differently set on the basis of an output according to the traveling state of any one or more of traveling speed, acceleration, deceleration, and standby.

As another example, the charging step may be performed by performing the charging according to charging condition information differently set on the basis of an output according to a weight of an article transported by the article transport vehicle.

As still another example, the charging step may be performed by measuring a temperature of a power receiving means of the article transport vehicle, and performing the charging on the basis of charging condition information differently set on the basis of a temperature range.

As yet another example, the charging step may be performed by comparing the measured temperature of the power receiving means of the article transport vehicle with a reference value or a threshold value, and controlling a charging current or stopping the charging.

According to another aspect of the present disclosure, there is provided an article transport system comprising an article transport vehicle including: an energy storage means mounted by being selected according to requirements of an article transport system among different types of energy storage means; a power receiving means configured to receive power from a power feeding line of a rail; a power supply means configured to supply the received power of the power receiving means to the energy storage means and provide energy stored in the energy storage means to a driving unit; and a control means configured to determine a type of the energy storage means, determine traveling condition information differently set for each type of the energy storage means, and control a traveling state of the article transport vehicle on the basis of traveling condition information corresponding to the energy storage means.

In some embodiments, the control means may include: an energy storage means setting unit configured to determine the type of the energy storage means; a traveling condition determination unit configured to retain the traveling condition information differently set for each type of the energy storage means, and determine traveling condition information corresponding to the determined type of the energy storage means; and an operation state control unit configured to manage and control power operation for the energy storage means, and control the traveling state of the article transport vehicle on the basis of the traveling condition information.

As an example, the energy storage means may include a capacitor, and the control means may control the traveling state of the article transport vehicle on the basis of traveling condition information set corresponding to a capacity of the capacitor of the energy storage means.

As another example, the energy storage means may include a battery and a battery management unit configured to measure an amount of remaining energy and a lifespan of the battery and manage charging and discharging of the battery, and the control means may control the traveling state of the article transport vehicle on the basis of traveling condition information set corresponding to the amount of remaining energy in the energy storage means.

As an example, the article transport system including; a rail network connecting a plurality of ports, including a power feeding section rail and a non-power feeding section rail, and configured to support traveling of the article transport vehicle; and a higher-level management device configured to issues a command to the article transport vehicle to transport an article and manage the traveling state of the article transport vehicle.

In some embodiments, the higher-level management device may set a travel route on the basis of the traveling state of the article transport vehicle and provide the travel route to the article transport vehicle.

According to yet another aspect of the present disclosure, there is provided a method for operation of an article transport vehicle in which an energy storage means selected according to requirements of an article transport system among different types of energy storage means is mounted, the method including: an energy storage means type determination step of determining whether the type of the energy storage means mounted in the article transport vehicle is a capacitor or a battery; a traveling condition information determination step of determining traveling condition information differently set for each type of the energy storage means, determining a capacity of the capacitor and determining traveling condition information corresponding thereto in the case of the capacitor, and determining an amount of remaining energy in the battery and determining traveling condition information corresponding thereto in the case of the battery; and a traveling state control step of controlling a traveling state and power operation of the article transport vehicle on the basis of the traveling condition information, wherein the traveling state control step may be performed by: determining whether to allow the article transport vehicle to enter a non-power feeding section on the basis of the amount of remaining energy in the energy storage means including the battery or whether a preceding article transport vehicle exists; determining a lifespan of the battery, comparing the lifespan with a reference value, reporting a battery replacement situation to a higher-level management device when it is necessary to replace the battery, and allocated a transport vehicle maintenance area from the higher-level management device; and performing charging according to charging condition information differently set on the basis of an output according to the traveling state in a power feeding section and a temperature according to reception of power through a rail.

According to the present disclosure as described above, the type and capacity of the energy storage means to be mounted are selected in consideration of the requirements of the article transport system and the state of related equipment. In particular, traveling of the article transport vehicle is controlled under a traveling condition corresponding to the mounted energy storage means, thereby improving the operating efficiency of the entire system. In addition, the output of the article transport vehicle is controlled in consideration of the mounted energy storage means, thereby achieving optimal power operation.

According to the embodiment of the present disclosure, the charging level of the battery of the energy storage means is controlled according to the traveling state of the article transport vehicle, thereby improving the operating efficiency of the article transport vehicle and improving the operating efficiency of the battery.

According to the embodiment of the present disclosure, the charging current is controlled in consideration of the temperature during charging, thereby achieving stable operation.

According to the embodiment of the present disclosure, the traveling state of the article transport vehicle is controlled by determining whether a condition sufficient to allow the article transport vehicle to pass through the non-power feeding section is satisfied when the article transport vehicle is traveling on the rail in which both the power feeding section and the non-power feeding section exist, thereby preventing a situation in which the article transport vehicle is impossible to travel in the non-power feeding section due to lack of power.

According to the embodiment of the present disclosure, the lifespan of the battery of the energy storage means is determined and the battery having a lifespan equal to or less than a predetermined level is repaired or replaced, thereby maintaining the battery in an optimal state and thus improving the operating efficiency of the entire system.

The effects of the present disclosure are not limited to those mentioned above, and other effects not mentioned will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, exemplary embodiments of the present disclosure will be described in detail with reference to the accompanying drawings, but the present disclosure is not limited or restricted by the described embodiments.

For a better understanding of the present disclosure, its operating advantages and the specific objectives attained by its uses, reference is made to the descriptive matter in which the exemplary embodiments of the present disclosure are illustrated.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used herein, specify the presence of stated features, integers, steps, operations, elements, components, and/or combinations of them but do not preclude the presence or addition of one or more other features, integers, steps, operations, elements, components, and/or combinations thereof.

In the following description, detailed descriptions of known functions and components incorporated herein will be omitted when it may make the subject matter of the present disclosure unclear.

The present disclosure proposes a technology that controls a traveling state and power operation of an article transport vehicle for each situation according to a traveling condition suitable for an energy storage means selected and mounted according to the requirements of an article transport system, thereby improving the operational efficiency of the entire article transport system.

In describing the present disclosure hereinafter through an embodiment of the present disclosure, for convenience of explanation, a case where an OHT vehicle is applied to an article transport system will be described as an example, but the present disclosure is not limited thereto. Thus, various other article transport vehicles for the article transport system would also be within the scope of the embodiment of the present disclosure.

Figure 1:
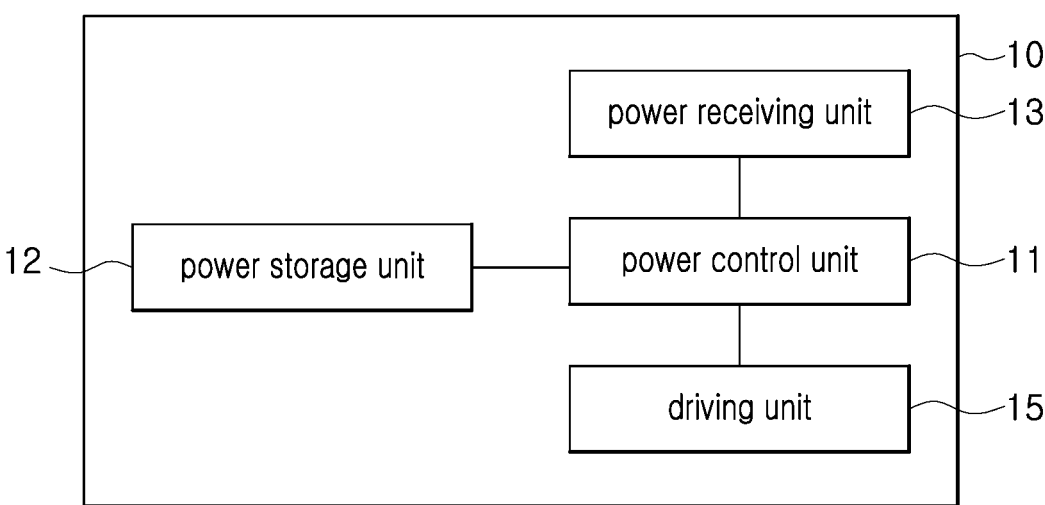
FIG. 1 a schematic block diagram illustrating an article transport automation system.
Figure 2A:
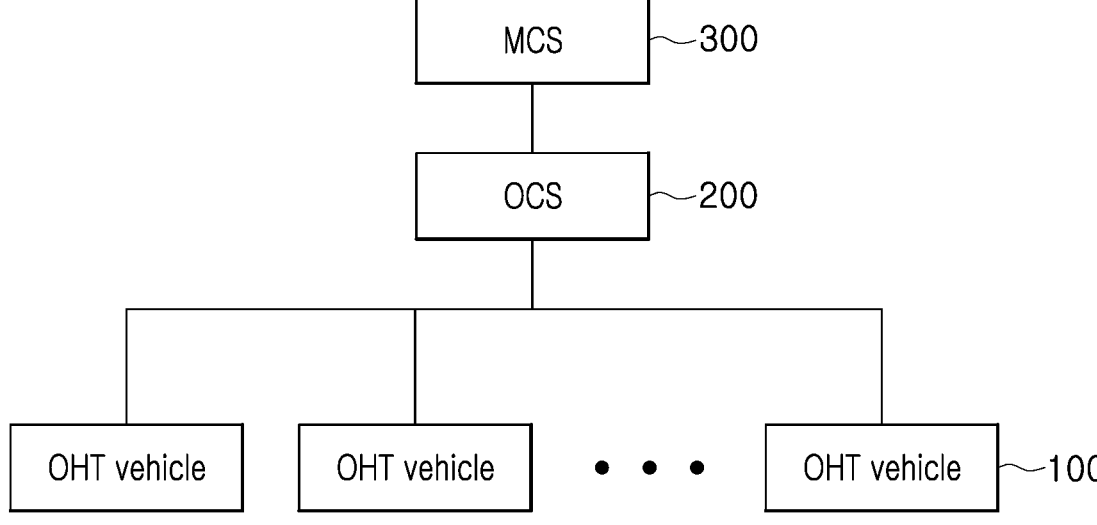
FIGS. 2A and 2B are views illustrating an embodiment of an article transport system according to the present disclosure.
Figure 2B:
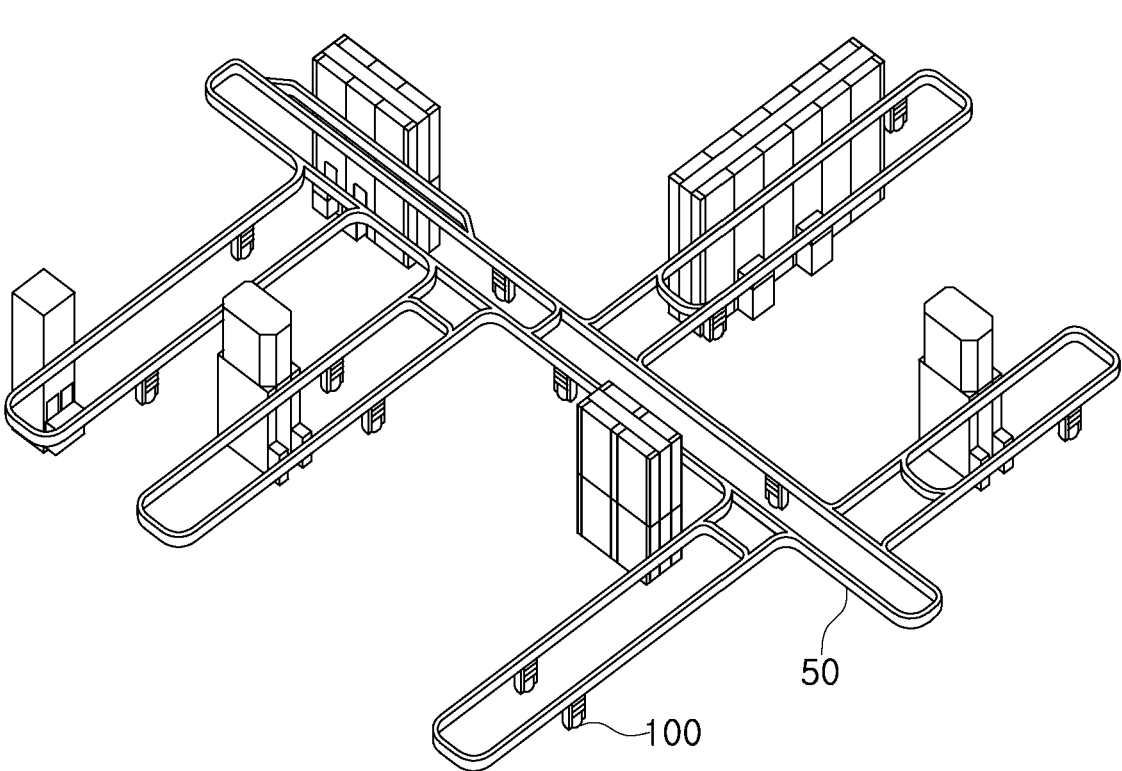

FIGS. 2A and 2B are views schematically illustrating the configuration of an article transport system according to the present disclosure.

An OHT vehicle 100 may travel on a rail 50 installed on the ceiling and may be wirelessly interfaced with a higher-level management device, e.g., an OHT control system (OCS) 200, which issues a transport operation command. The OCS 200 may receive a transport command according to an operation process from a material control system (MCS) 300, search for the shortest route from a starting point to a destination to enable the OHT vehicle 100 to complete the transport operation in the shortest time in accordance with the command from the MCS 300, select an OHT vehicle in an optimal position suitable for performing the transport operation, and then issue the transport command. The OHT vehicle 100 may transport an article from an arbitrary port commanded by the OCS 200 to a destination port in accordance with the transport command from the OCS 200.

The rail 50 may be configured as a network in order to connect numerous ports of manufacturing equipment. In the present disclosure, a rail network may supply power to the OHT vehicle 100. As an example, the OHT vehicle 100 may receive power in a non-contact manner through a power feeding rail. Depending on situations, the rail network may include a power feeding section and a non-power feeding section where power is not supplied. For the feeding section and the non-feeding section in the rail network, section information on whether power is supplied may be acquired and retained in advance in response to design considerations.

In addition, the article transport system may include a transport vehicle maintenance area (not illustrated) for maintenance of the OHT vehicle 100. A maintenance lift may be provided in the transport vehicle maintenance area. As an example, maintenance and replacement of an energy storage means of the OHT vehicle 100 may be performed in the transport vehicle maintenance area.

The OHT vehicle 100 may transport a semiconductor substrate such as a wafer, and may transport a transport container such as a FOUP or FOSB capable of accommodating a plurality of substrates in a state the substrates are stored in the transport container.

In the present disclosure, an energy storage means selected according to the requirements of the article transport system among different types of energy storage means may be mounted in the OHT vehicle. A traveling state of the OHT vehicle 100 may be controlled on the basis of traveling condition information corresponding to the mounted energy storage means.

Figure 3A:
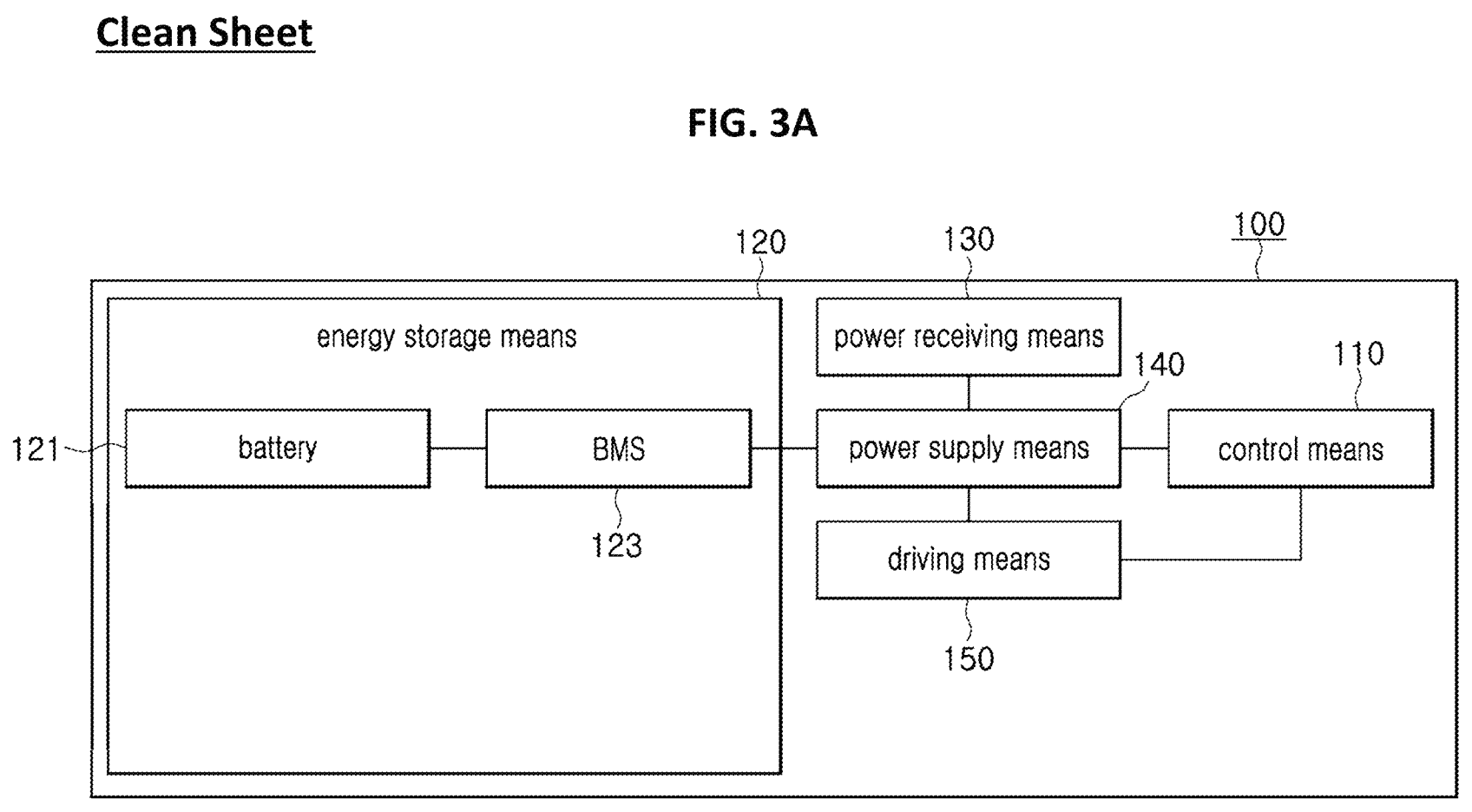
Figure 3B:
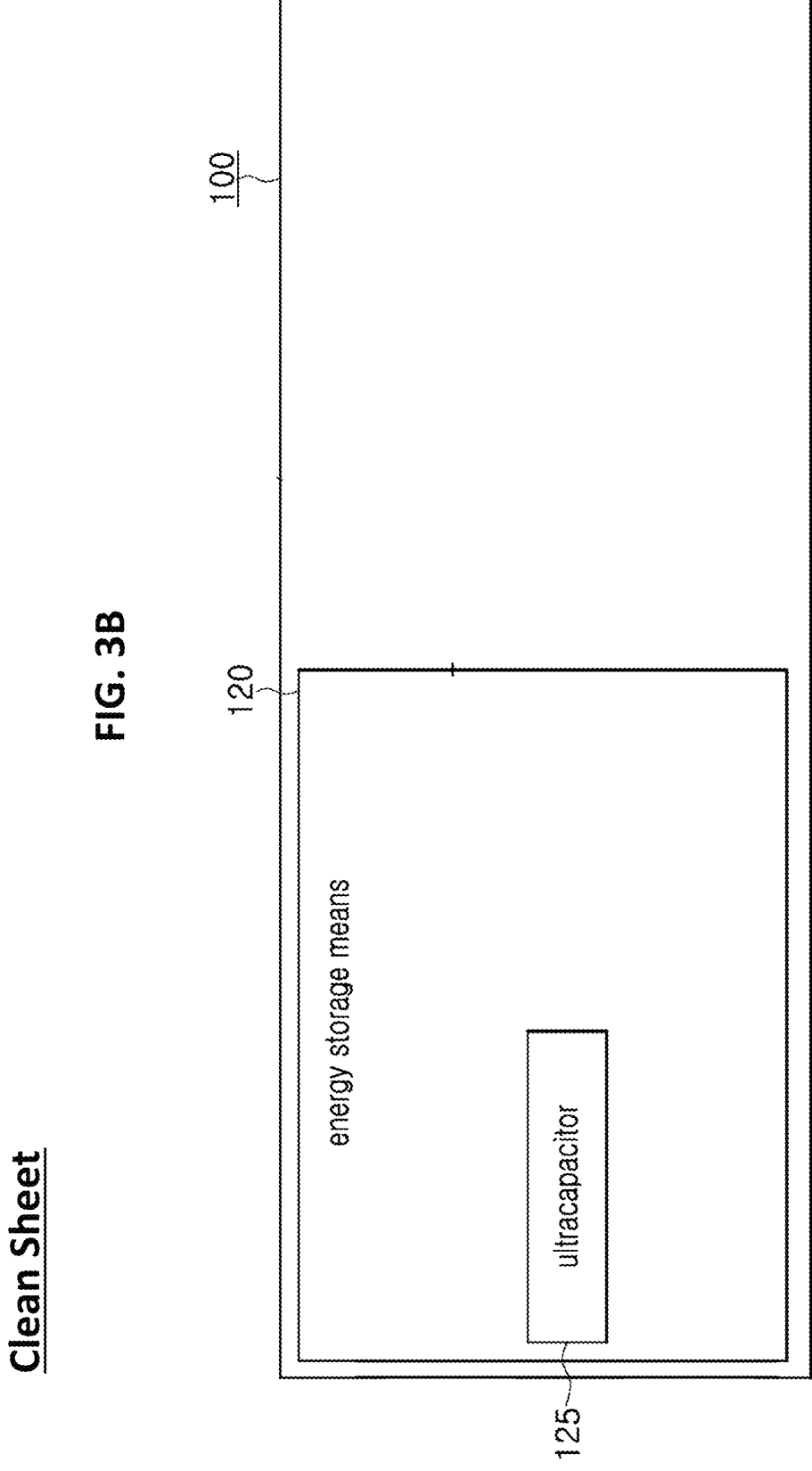
FIG. 3 is a block diagram illustrating an embodiment of an article transport vehicle according to the present disclosure.
Figure 3C:
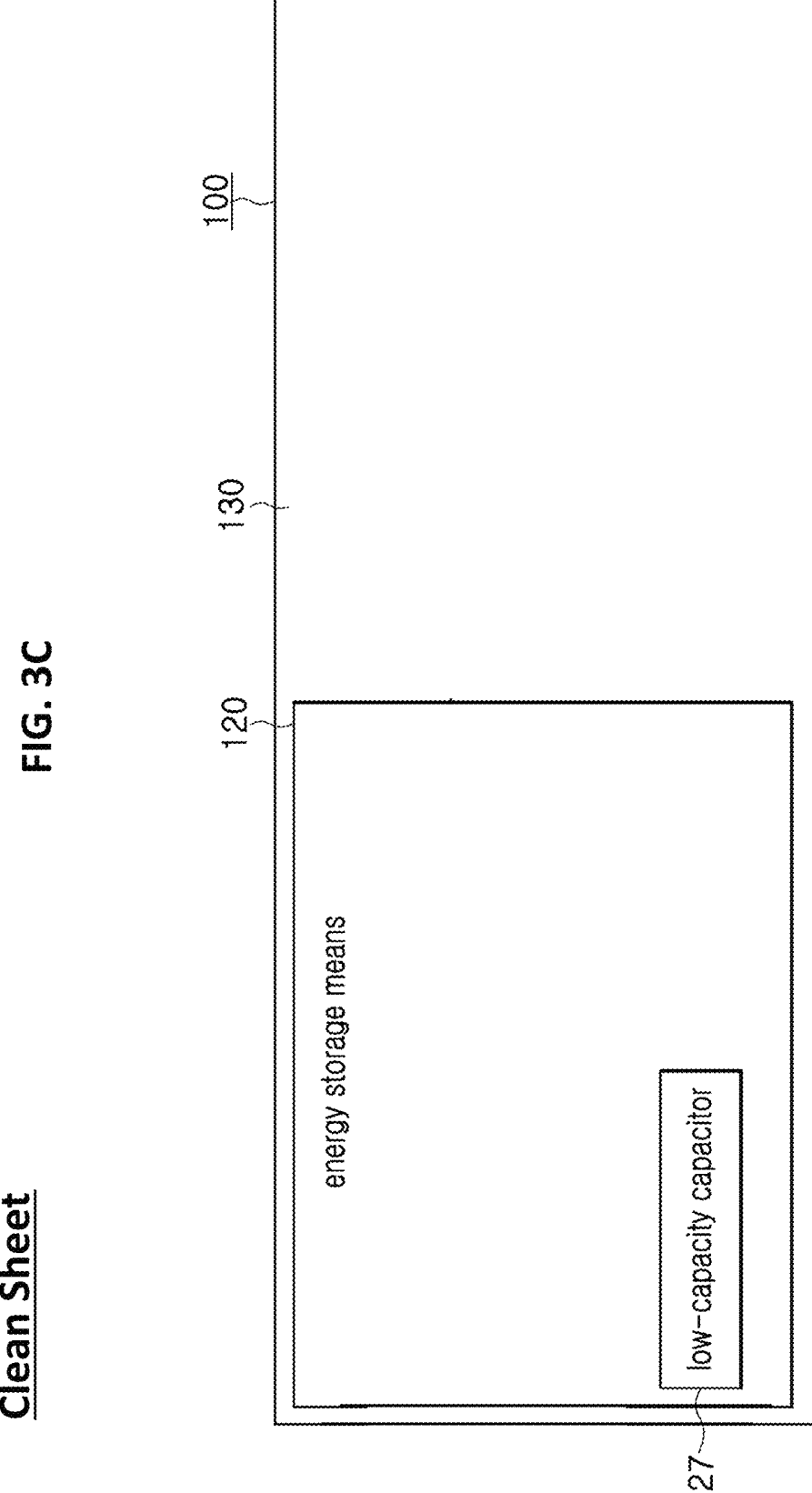

FIG. 3 is a block diagram illustrating an embodiment of an article transport vehicle 100 according to the present disclosure.

The article transport vehicle 100 may include a control means 110, an energy storage means 120, a power receiving means 130, a power supply means 140, a driving means 150, and the like. In addition, the article transport vehicle 100 may include various configurations for driving on a rail and various configurations for transporting articles, but a description thereof will be omitted.

The power receiving means 130 may receive power from the rail. In some embodiments, the power receiving means 130 may receive power from the rail in a non-contact manner.

The power supply means 140 may include a regulator that outputs a rated voltage using the power received from the power receiving means 130. The power supply means 140 may supply driving power to the driving means 150. The driving means 150 may include a driving motor and a driving controller for controlling the driving motor, and may operate the article transport vehicle 100 by controlling driving power with the power supplied from the power supply means 140.

In addition, the power supply means 140 may supply power to the energy storage means 120. Depending on situations, the power supply means 140 may selectively supply a static current or a variable current to the energy storage means 120. In addition, the power supply means 140 may selectively control whether to supply power to the energy storage means 120.

The energy storage means 120 may include an energy storage means selected from various types such as a battery 121 and capacitors 125 and 127 according to the requirements of an article transport system.

The capacitors 125 and 127 may include a low-capacity capacitor 127 and an ultracapacitor 125 depending on capacity, and may be selectively mounted according to the requirements of the article transport system.

The capacitors 125 and 127 may provide stored energy when an output equal to or higher than a predetermined level is required for the article transport vehicle 100. For example, when the article transport vehicle needs to travel or accelerate at a high speed equal to or higher than a predetermined level, the capacitors 125 and 127 may provide stored energy.

The low-capacity capacitor 127 may supply energy in response to a traveling state of the article transport vehicle 100, such as a relatively low maximum speed, acceleration, or the like. The ultracapacitor 125 may supply energy in response to a traveling state of the article transport vehicle 100, such as a relatively high maximum speed, acceleration, or the like.

In addition, the capacitors 125 and 127 may receive regenerative energy generated during deceleration of the article transport vehicle from the power supply means 140.

The battery 121 may provide stored energy when the article transport vehicle 100 operates in a non-power feeding section or when an output equal to or higher than a predetermined level is required.

The battery 121 may be managed by a battery management unit, e.g., a battery management system (BMS) 123. The BMS 123 may measure the amount of remaining energy in the battery 121 to control charging and discharging. In addition, the BMS 123 may measure the energy efficiency or internal resistance of the battery 121 and determine the lifespan of the battery 121 on the basis of the measurement result.

The control means 110 may manage and control a power operation state and a traveling state of the article transport vehicle 100.

The control means 110 may determine the type of the energy storage means 120 mounted in the article transport vehicle 100, determine traveling condition information set corresponding to the type of the energy storage means 120, and control the power operation state and the traveling state of the article transport vehicle 100 on the basis of the corresponding traveling condition information.

Figure 4:
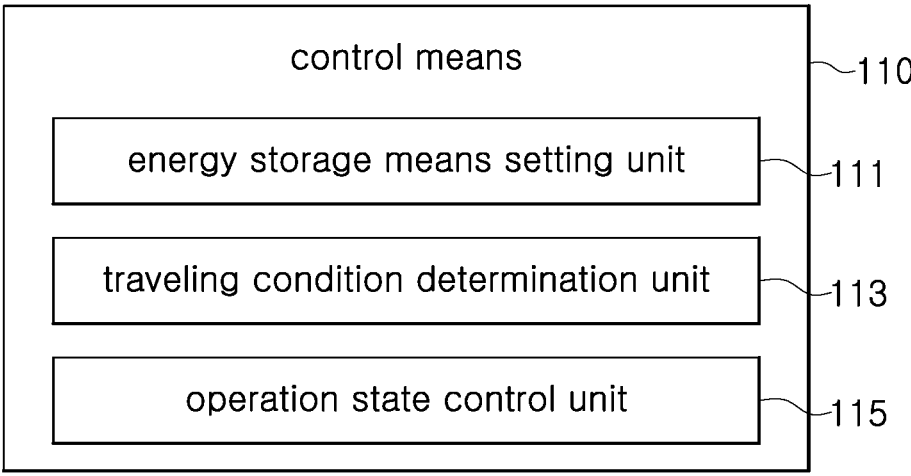
FIG. 4 is a block diagram illustrating an embodiment of a control means of the article transport vehicle according to the present disclosure.

Regarding the control means 110, FIG. 4 illustrates an embodiment of a control means 110 for power operation according to the present disclosure.

The control means 110 may include an energy storage means setting unit 111, a traveling condition determination unit 113, an operation state control unit 115, and the like.

The energy storage means setting unit 111 may determine the type and capacity of an energy storage means mounted in the article transport vehicle. As an example, the type and capacity of the energy storage means mounted in the article transport vehicle may be set as default information by an administrator in advance, and the energy storage means setting unit 111 may retain the set default information and determine the type and capacity of the energy storage means on the basis of the information.

The traveling condition determination unit 113 may retain traveling condition information differently set for each type and capacity of the energy storage means, and extract and provide traveling condition information corresponding to the type and capacity of the energy storage means determined by the energy storage means setting unit 111.

The operation state control unit 115 may determine, manage, and control the power operation state and the traveling state of the article transport vehicle.

The operation state control unit 115 may control the traveling state of the article transport vehicle on the basis of traveling condition information. As an example, the operation state control unit 115 may control the maximum speed, acceleration, deceleration, and the like of the article transport vehicle on the basis of the traveling condition information. In addition, the operation state control unit 115 may provide traveling state information to a higher-level management device while monitoring the traveling state of the article transport vehicle.

Furthermore, the operation state control unit 115 may determine a power feeding section and a non-power feeding section of a rail network, and control the traveling state of the article transport vehicle according to a travel route on the basis of the type of the energy storage means of the article transport vehicle.

In addition, the operation state control unit 115 may control the power operation state for charging and discharging of the energy storage means. As an example, when the energy storage means includes a battery and a battery management unit, the operation state control unit 115 may control the traveling state of the article transport vehicle on the basis of the amount of remaining energy in the battery, and control the power operation state for charging and discharging of the battery.

In the article transport vehicle according to the present disclosure, the type and capacity of the energy storage means to be mounted are selected in consideration of the requirements of the article transport system and the state of related equipment. In particular, traveling of the article transport vehicle is controlled under a traveling condition corresponding to the mounted energy storage means, thereby improving the operating efficiency of the entire system. In addition, the output of the article transport vehicle is controlled in consideration of the mounted energy storage means, thereby achieving optimal power operation.

The present disclosure proposes a method for operation of an article transport vehicle, the method being capable of improving the operational efficiency and stability of the article transport vehicle described above and the article transport system to which the same is applied. Hereinafter, the method for operation of the article transport vehicle according to the present disclosure will be described through embodiments.

Since the method for operation of the article transport vehicle according to the present disclosure is applied to the article transport vehicle according to the present disclosure described above and the article transport system to which the same is applied, reference will also be made to the embodiments of the article transport vehicle according to the present disclosure and the article transport system to which the same is applied.

Figure 5:
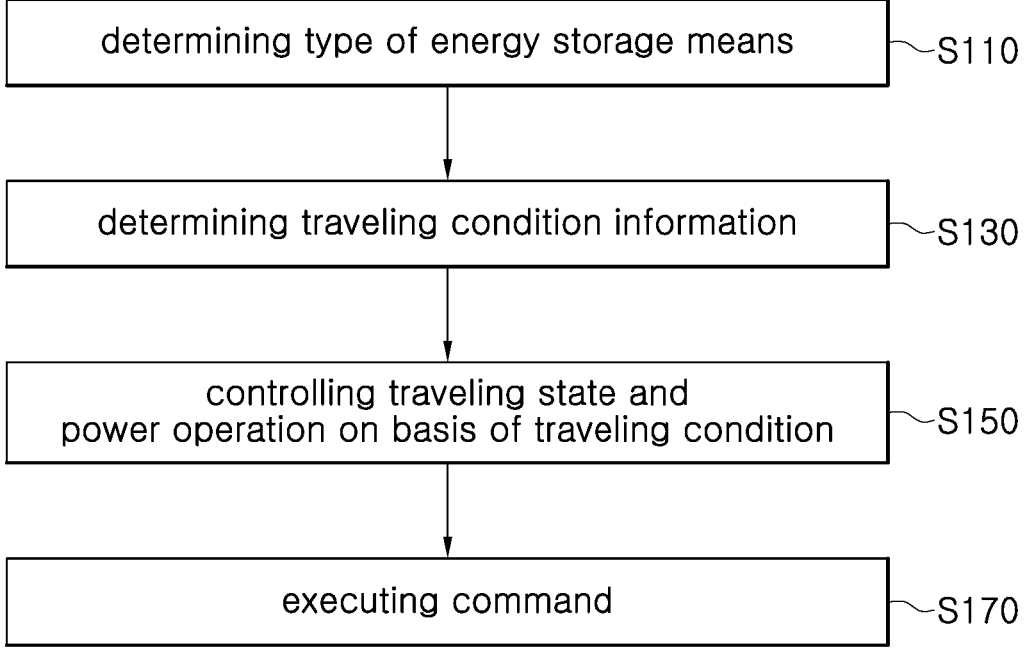
FIG. 5 is a flowchart illustrating an embodiment of a method for operation of an article transport vehicle according to the present disclosure.

FIG. 5 is a flowchart illustrating an embodiment of a method for operation of an article transport vehicle according to the present disclosure.

A control means 110 may determine the type and capacity of an energy storage means by determining an energy storage means 120 of an article transport vehicle 100 (S110).

As an example, whether a battery or a capacitor is mounted as the energy storage means may be determined, and the capacity of the capacitor may be determined. The type and capacity of the energy storage means may be set as default information by an administrator while the corresponding energy storage means is selected and mounted in the article transport vehicle 100.

The control means 110 may determine traveling condition information corresponding to the type and capacity of the energy storage means mounted in the article transport vehicle 100 (S130), and then extract the corresponding traveling condition information and control a traveling state and power operation of the article transport vehicle 100 on the basis of the corresponding traveling condition information (S150).

The article transport vehicle 100 may perform a command issued from a higher-level management device 200 while the traveling state and power operation thereof are controlled by the control means 110 according to a traveling condition corresponding to the energy storage means (S170).

A process in which the control means 110 controls the operation state and power operation of the article transport vehicle 100 will be described in more detail through a detailed embodiment.

Figure 6:
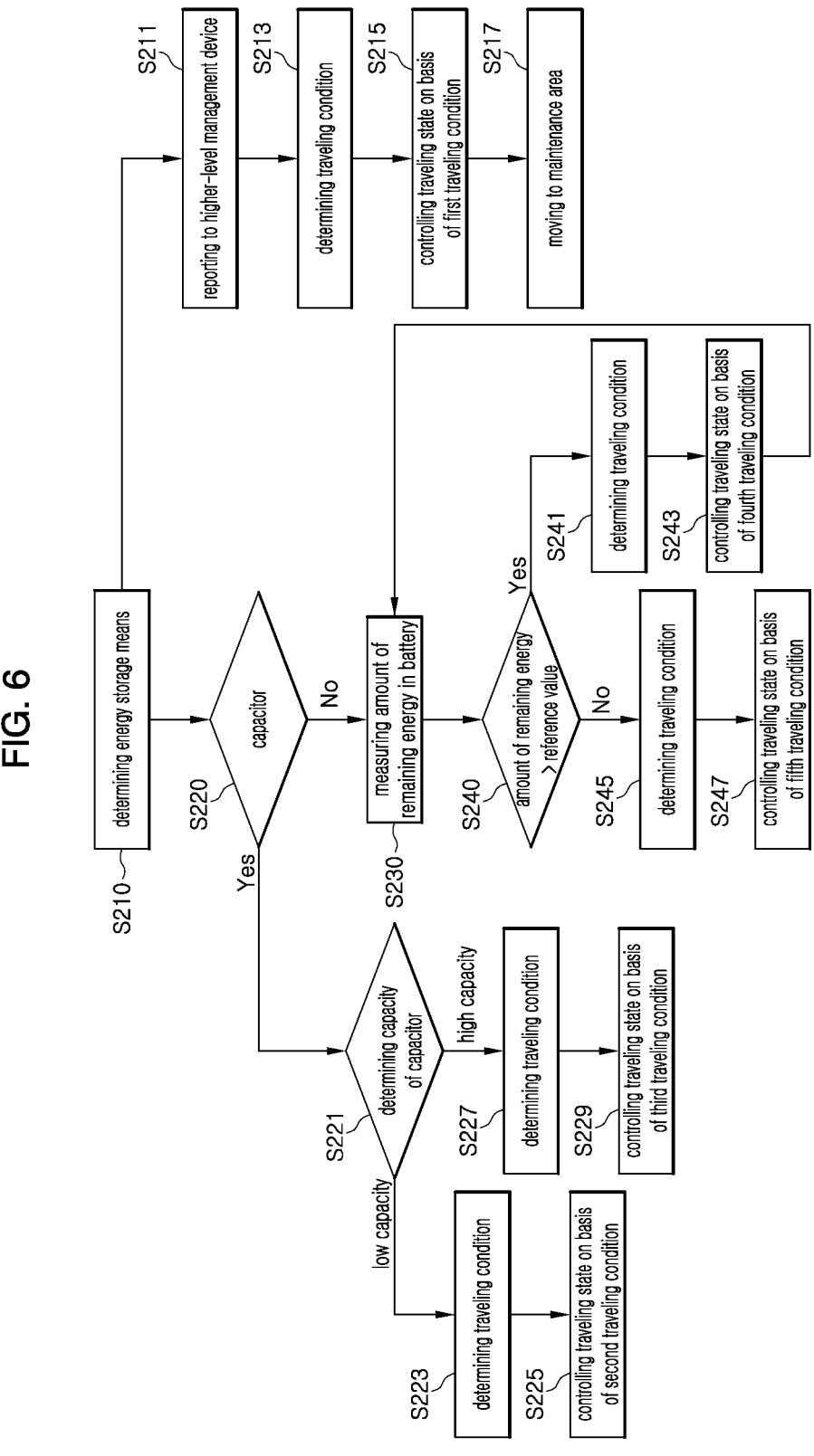
FIG. 6 is a flowchart illustrating a process of controlling a traveling state according to the type and capacity of an energy storage means in the method for operation of the article transport vehicle according to the present disclosure.

FIG. 6 is a flowchart illustrating a process of controlling a traveling state according to the type and capacity of an energy storage means in the method for operation of the article transport vehicle according to the present disclosure.

A control means 110 may determine an energy storage means mounted in an article transport vehicle 100 (S210).

When it is impossible to determine the energy storage means mounted in the article transport vehicle 100 or no energy storage means is mounted, the control means 110 may report this situation to a higher-level management device 200 (S211), and be allocated a transport vehicle maintenance area for mounting the energy storage means from the higher-level management device 200.

Then, the control means 110 may determine a traveling condition corresponding to a case where no energy storage means is mounted (S213), and allow the article transport vehicle 100 to be moved to the transport vehicle maintenance area (S217) while controlling a traveling state and a power operation state of the article transport vehicle 100 on the basis of a first traveling condition (S215). As an example, the first traveling condition may be a traveling condition in which acceleration and deceleration are reduced as much as possible while the article transport vehicle 100 travels at a minimum speed because the article transport vehicle 100 has to travel only by power supplied to a rail.

When a capacitor is applied as the energy storage means (S220), the control means 110 may determine the capacity of the capacitor (S221).

When an ultracapacitor is mounted, the control means 110 may determine a traveling condition corresponding to the ultracapacitor (S223), and execute a command received from the higher-level management device 200 while controlling the traveling state and the power operation state of the article transport vehicle 100 on the basis of a second traveling condition (S225). As an example, the second traveling condition may be a traveling condition in which acceleration and deceleration are increased as much as possible while the article transport vehicle 100 travels at a maximum speed because instantaneous output can be increased as much as possible through the ultracapacitor.

As another case, when a low-capacity capacitor is mounted, the control means 110 may determine a traveling condition corresponding to the low-capacity capacitor (S227), and execute a command received from the higher-level management device 200 while controlling the traveling state and the power operation state of the article transport vehicle 100 on the basis of a third traveling condition (S229). As an example, the third traveling condition may be a traveling condition in which acceleration and deceleration are reduced as much as possible while the article transport vehicle 100 travels at a maximum speed because instantaneous output can be increased through the low-capacity capacitor, but the power supply time is relatively short.

When a battery is applied as the energy storage means, the control means 110 may measure the amount of remaining energy in the battery through a battery management unit (S230), and then compare the amount of remaining energy with a reference value (S240) and control the traveling state and the power operation state of the article transport vehicle 100 according to the amount of remaining energy.

When the amount of remaining energy in the battery exceeds the reference value, the control means 110 may determine a traveling condition corresponding to this (S241), and execute a command received from the higher-level management device 200 while controlling the traveling state and the power operation state of the article transport vehicle 100 on the basis of a fourth traveling condition (S243). As an example, the fourth traveling condition may be a traveling condition in which acceleration and deceleration are maintained at a constant level while the article transport vehicle 100 travels at a maximum speed because the output can be increased to a predetermined level through the amount of remaining energy stored in the battery.

When the amount of remaining energy in the battery is equal to or lower than the reference value, the control means 110 may determine a traveling condition corresponding to this (S245), and execute a command received from the higher-level management device 200 while controlling the traveling state and the power operation state of the article transport vehicle 100 on the basis of a fifth traveling condition (S247). As an example, the fifth traveling condition may be a traveling condition in which acceleration and deceleration are reduced as much as possible while the article transport vehicle 100 travels at a maximum speed because the output can be increased to a predetermined level through the amount of remaining energy stored in the battery, but the amount of remaining energy is insufficient.

As described above, the present disclosure improves the operating efficiency of the entire system by enabling the article transport vehicle to travel according to a traveling condition suitable for the type and capacity of the energy storage means mounted in the article transport vehicle.

Figure 7:
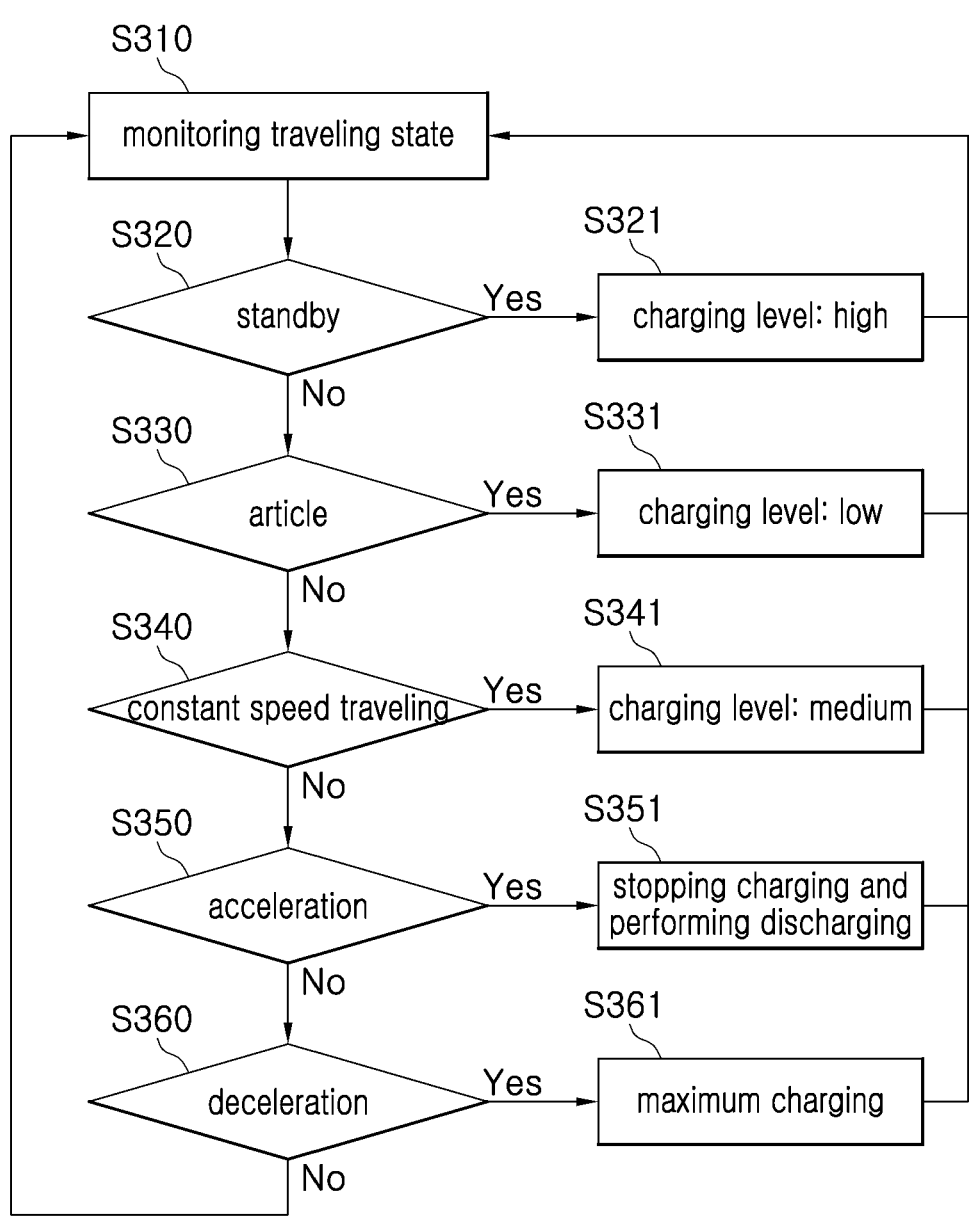
FIGS. 7 and 8 are flowcharts each illustrating an embodiment of a process for controlling a state of charge of an energy storage means in the method for operation of the article transport vehicle according to the present disclosure.
Figure 8:
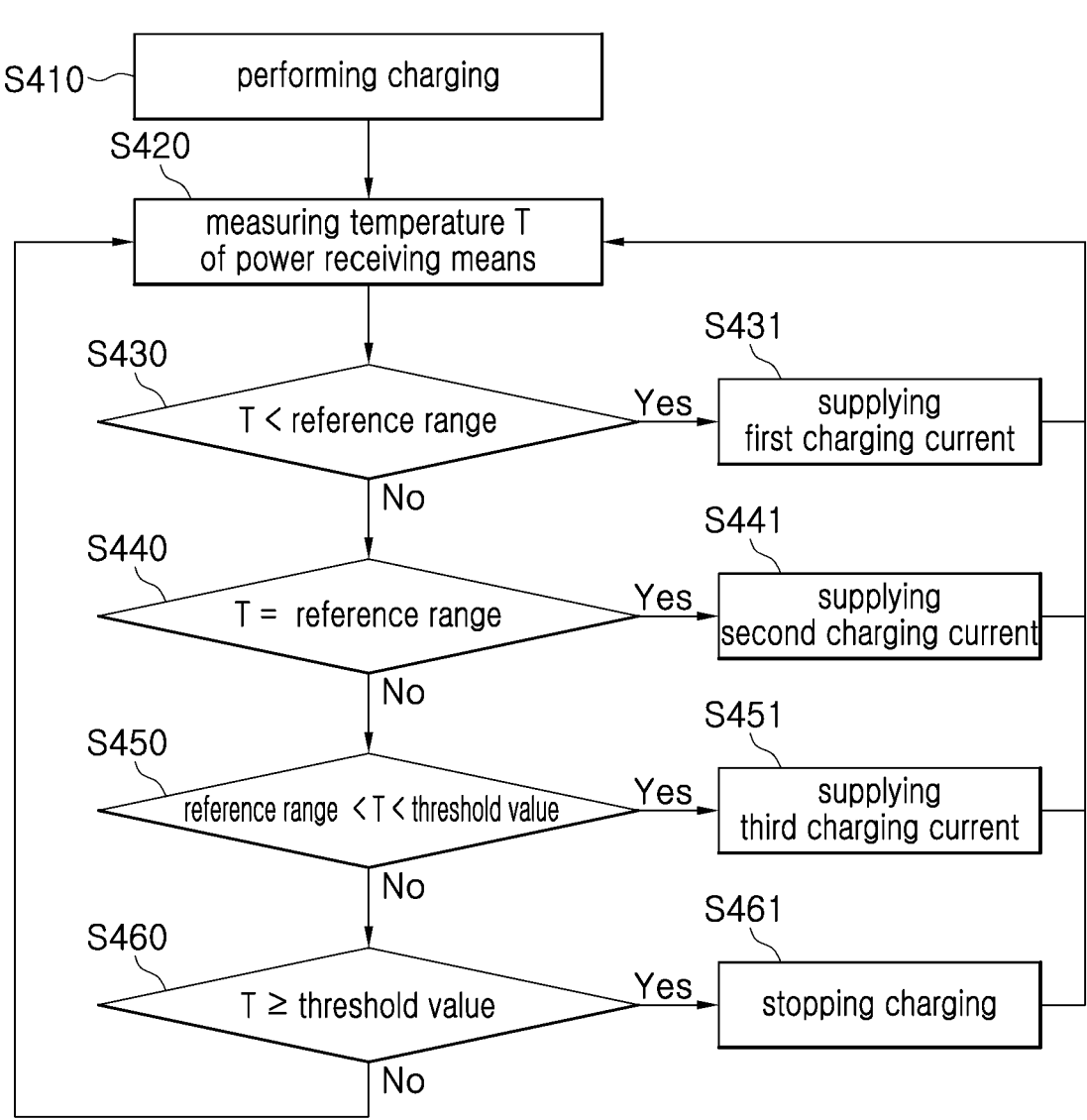

FIGS. 7 and 8 are flowcharts each illustrating an embodiment of a process for controlling a state of charge of an energy storage means in the method for operation of the article transport vehicle according to the present disclosure.

This embodiment relates to a case where an energy storage means 120 including a battery is mounted in an article transport vehicle 100, and illustrates an example of optimally controlling the state of charge of the battery of the energy storage means 120 through a control means 110.

FIG. 7 illustrates an example in which the control means 110 controls charging of the battery of the energy storage means 120 in response to a traveling state of the article transport vehicle 100.

The control means 110 may optimally control charging of the battery of the energy storage means 120 according to the traveling state of the article transport vehicle 100 while continuously monitoring the traveling state of the article transport vehicle 100 (S310).

When the article transport vehicle 100 is stopped in a standby state in a power feeding section (S320) due to various factors, the control means 110 may control a battery management unit to increase a charging level of the battery to a high level to charge the battery (S321). Here, the charging level is classified different levels according to a charging speed and a charging amount. As an example, when the charging level is high, the control means 110 may convert a charging current supplied from a power supply means 140 to the energy storage means 120 from a static current to a variable current to relatively increase the intensity of the supplied current.

When the article transport vehicle 100 is traveling in the power feeding section, the control means 110 may determine whether an article to be transported is loaded in the article transport vehicle 100 (S330), and control the battery management unit according to the weight of the article to lower the charge level of the battery to a low level to charge the battery (S331). When the article is loaded in the article transport vehicle 100 and the weight thereof is equal to or higher than a predetermined level, the output has to be increased accordingly, but sufficient output may not be obtained due to charging of the battery. In this case, the control means 110 may charge the battery with a low charging level. As an example, when the charging level is low, the control means 110 may convert the charging current supplied from the power supply means 140 to the energy storage means 120 from a static current to a variable current to relatively reduce the intensity of the supplied current.

When the article transport vehicle 100 does not load any article or the article transport vehicle 100 loads an article with a weight of equal to or less than a predetermined level and is traveling at a constant speed in the power feeding section (S340), the control means 110 may control the battery management unit to maintain the charging level of the battery at a middle level to charge the battery (S341). As an example, when the charging level is medium, the control means 110 may convert the charging current supplied from the power supply means 140 to the energy storage means 120 from a static current to a variable current to maintain the intensity of the supplied current at a predetermined level.

When the article transport vehicle 100 is traveling in an accelerated state (S350), the control means 110 may control the battery management unit to stop charging of the battery and supply power stored in the battery (S351). In order to increase the output during acceleration of the article transport vehicle 100, not only power supplied through a rail but also power stored in the battery have to be supplied. Thus, the control means 110 may control the battery management unit to additionally supply power stored in the battery to increase the output for acceleration.

On the contrary, when the article transport vehicle 100 is traveling in a decelerated state (S360), regenerative energy generated from a driving means 150 may also be used as charging energy, so the control means 110 may control the battery management unit to charge the battery with the maximum available power (S361).

As described above, the present disclosure controls the charging level of the battery of the energy storage means according to the traveling state of the article transport vehicle, thereby improving the operating efficiency of the article transport vehicle and improving the operating efficiency of the battery.

FIG. 8 illustrates an example in which when a battery of an energy storage means 120 is charged by power supplied through a power receiving means 130 of an article transport vehicle 100 in a power feeding section of a rail, charging is controlled according to a temperature change of the power receiving means 130.

A control means 110 may charge the battery of the energy storage means 120 according to a traveling state of the article transport vehicle 100 (S410) by applying the above-described embodiment of FIG. 7.

During charging, the control means 110 may measure a temperature T of the power receiving means 130 through a temperature measuring device provided in the power receiving means 130 (S420), and control charging of the battery of the energy storage means 120 on the basis of the measured temperature T.

When the measured temperature T is less than a reference range (S430), the control means 110 may control a power supply means 140 to supply a first charging current (S431) to charge the battery of the energy storage means 120. Here, the first charging current may be a current intensity of a maximum range set when the power supply means 140 supplies a variable current.

When the measured temperature T is within the reference range (S440), the control means 110 may control the power supply means 140 to supply a second charging current (S441) to charge the battery of the energy storage means 120. Here, the second charging current may be a current intensity of a predetermined stable range set when the power supply means 140 supplies a variable current.

When the measured temperature T exceeds the reference range but is less than a threshold value (S450), the control means 110 may control a power supply means 140 to supply a third charging current (S451) to charge the battery of the energy storage means 120. Here, the third charging current may be a current intensity of a minimum range set when the power supply means 140 supplies a variable current.

When the measured temperature T reaches or exceeds the threshold value (S460), it may be dangerous to continue charging, so the control means 110 may control the power supply means 140 to stop supply of the charging current (S461).

As described above, the present disclosure controls the charging current in consideration of the temperature during charging, thereby achieving stable operation.

Furthermore, the present disclosure controls the traveling state of the article transport vehicle according to the power feeding section and the non-power feeding section on the rail. In this regard, FIG. 9 illustrates a flowchart illustrating an embodiment of a process of controlling a traveling state according to a power feeding section and a non-power feeding section on a rail in the method for operation of the article transport vehicle according to the present disclosure.

Figure 9:
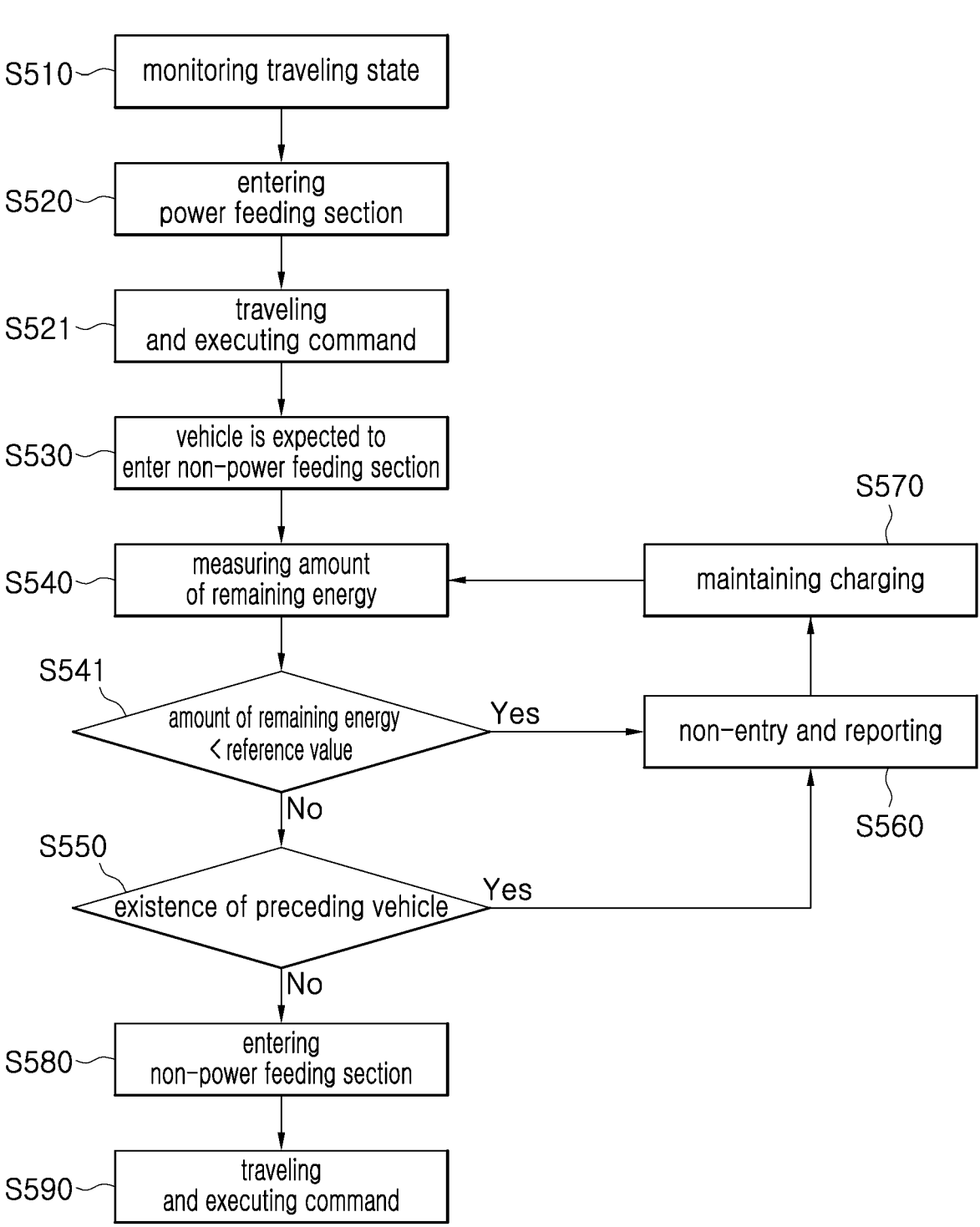
FIG. 9 is a flowchart illustrating an embodiment of a process of controlling a traveling state according to a power feeding section and a non-power feeding section on a rail in the method for operation of the article transport vehicle according to the present disclosure.

The embodiment of FIG. 9 illustrates an operation process for an article transport vehicle 100 in which a battery is mounted as an energy storage means 120.

A control means 110 may control a traveling state of the article transport vehicle 100 on the basis of information on the power feeding section and the non-power feeding section on the rail while continuously monitoring the traveling state of the article transport vehicle 100 (S510).

When the article transport vehicle 100 enters the power feeding section (S520), stable power may be supplied through the rail, so the control means 110 may report the traveling state of the article transport vehicle 100 to a higher-level management device 200, and then maintain traveling of the article transport vehicle 100 and execute a received command (S521).

When the article transport vehicle 100 is expected to enter the non-power feeding section (S530) while the control means 110 continuously determining a travel route of the article transport vehicle 100, the control means 110 may receive a measurement value obtained by measuring the amount of remaining energy in the battery (S540) through a battery management unit of the energy storage means 120, and compare the amount of remaining energy with a reference value (S541). Here, the reference value may be an amount of remaining energy required for traveling corresponding to the non-power feeding section.

When the amount of remaining energy is less than the reference value, the article transport vehicle 100 may not completely pass through the non-power feeding section, so the control means 110 may not allow the article transport vehicle 100 to enter the non-power feeding section and report the traveling state to the higher-level management device 200 (S560).

Then, the control means 110 may control the article transport vehicle 100 to maintain charging while slowing down or waiting in the power feeding section (S570).

Furthermore, the higher-level management device 200 may determine the overall operating state of the rail and provide bypass route information so that the article transport vehicle 100 is bypassed to another route when necessary, and the control means 110 may receive the bypass route information from the higher-level management device 200 and allow the article transport vehicle 100 to travel to a bypass route.

When the amount of remaining energy is sufficient to allow the article transport vehicle 100 to pass through the non-power feeding section before the article transport vehicle 100 enters the non-power feeding section, the control means 110 may detect whether a preceding article transport vehicle exists through a sensor provided in the article transport vehicle 100, or receive information on the preceding article transport vehicle from the higher-level management device 200.

When the preceding article transport vehicle exists in the non-power feeding section (S550), the control means 110 may not allow the article transport vehicle 100 to enter the non-power feeding section by slowing down or waiting in the power feeding section and report the traveling state to the higher-level management device 200 (S560).

When the amount of remaining energy is sufficient to allow the article transport vehicle 100 to pass through the non-power feeding section and the article transport vehicle 100 maintains a sufficient distance from the preceding article transport vehicle, the control means 110 may allow the article transport vehicle 100 to enter the non-power feeding section (S580), and then execute a received command while allowing the article transport vehicle 100 to travel in the non-power feeding section (S590).

As described above, the present disclosure controls the traveling state of the article transport vehicle by determining whether a condition sufficient to allow the article transport vehicle to pass through the non-power feeding section is satisfied when the article transport vehicle is traveling on the rail in which both the power feeding section and the non-power feeding section exist, thereby preventing a situation in which the article transport vehicle is impossible to travel in the non-power feeding section due to lack of power.

Furthermore, the present disclosure determines the lifespan of the energy storage means and controls the traveling state of the article transport vehicle accordingly. In this regard, FIG. 10 illustrates a flowchart illustrating an embodiment of a process of controlling a traveling state according to the lifespan of an energy storage means in the method for operation of the article transport vehicle according to the present disclosure.

Figure 10:
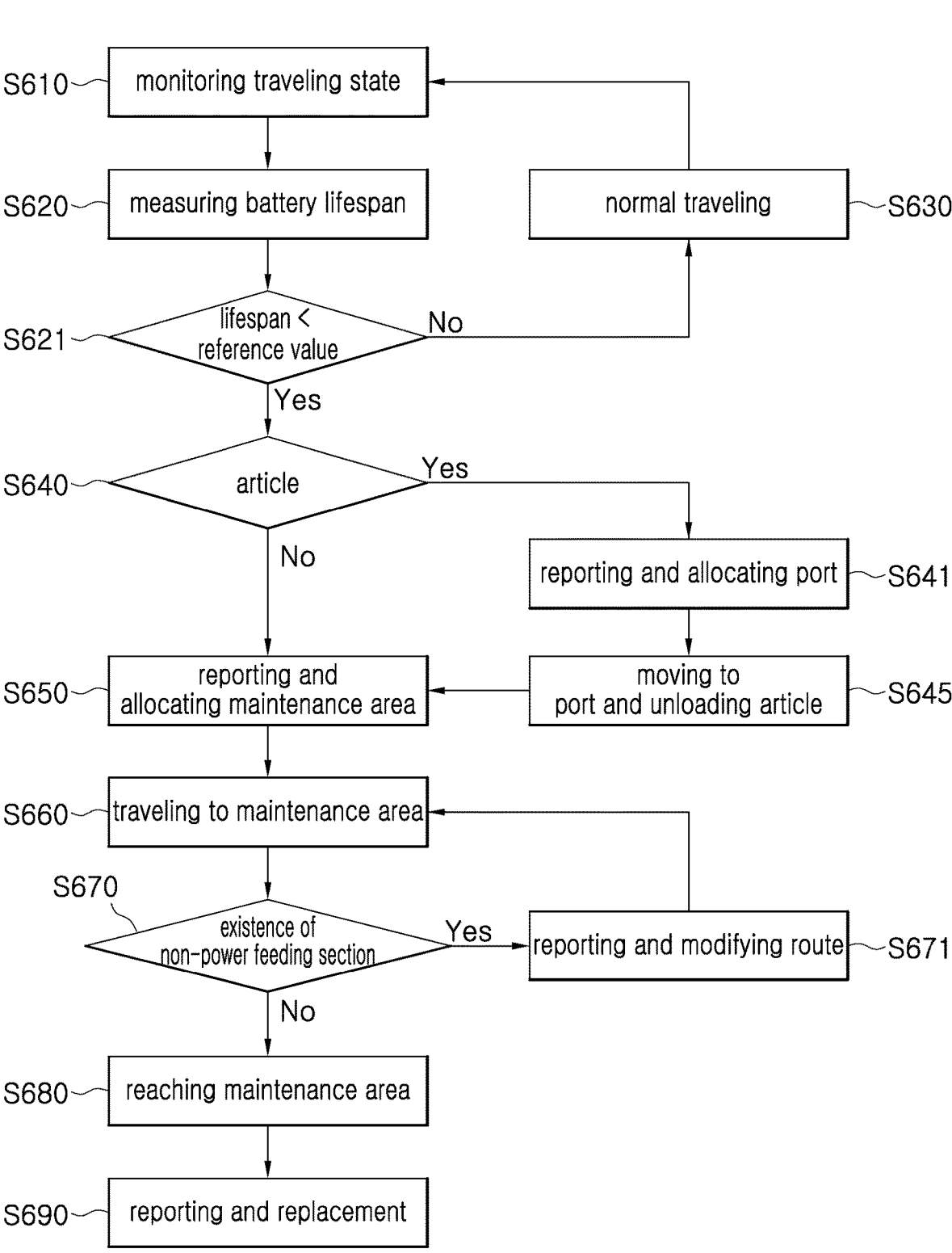
FIG. 10 is a flowchart illustrating an embodiment of a process of controlling a traveling state according to the lifespan of an energy storage means in the method for operation of the article transport vehicle according to the present disclosure.

The embodiment of FIG. 10 illustrates an operation process for an article transport vehicle 100 in which a battery is mounted as an energy storage means 120.

A control means 110 may measure the lifespan of the battery through a battery management unit of the energy storage means 120 (S620) while continuously monitoring a traveling state of the article transport vehicle 100 (S610). The battery management unit of the energy storage means 120 may measure the energy efficiency or internal resistance of the battery according to charging and discharging of the battery, and may determine the lifespan of the battery on the basis of the measurement result.

The control means 110 may compare the battery's lifespan determined by the battery management unit with a reference value (S621), and when the battery's lifespan is equal to or higher than the reference value, the control means 110 may allow the article transport vehicle 100 to travel normally through the above-described process (S630).

When the battery's lifespan is less than the reference value, the operating efficiency of the battery may be reduced, so the control means 110 may determine that the battery needs to be replaced.

In this case, the control means 110 may determine whether an article to be transported is loaded in the article transport vehicle 100 (S640), and when the article is determined to be loaded, the control means 110 may report the corresponding situation to a higher-level management device 200 and be allocated with a port for unloading the article from the higher-level management device 200 (S641).

The control means 110 may allow the article transport vehicle 100 to be moved to the allocated port and unload the article (S645) while controlling the traveling state on the basis of the amount of remaining energy in the energy storage means 120 through the process described above and performing charging in a power feeding section.

When the article is not loaded in the article transport vehicle 100 or the loaded article is unloaded to the allocated port, the control means 110 may report the corresponding situation to the higher-level management device 200 and be allocated a transport vehicle maintenance area from the higher-level management device 200 (S650).

The control means 110 may allow the article transport vehicle 100 to travel to the allocated transport vehicle maintenance area (S660) while controlling the traveling state on the basis of the amount of remaining energy in the energy storage means 120 through the process described above.

When a non-power feeding section exists on a travel route (S670), the control means 110 may report the existence of the non-power feeding section to the higher-level management device 200 and receive a travel route bypassing the non-power feeding section from the higher-level management device 200 to modify the travel route (S671).

When the article transport vehicle 100 reaches the allocated transport vehicle maintenance area (S680), the control means 110 may report the arrival to the transport vehicle maintenance area to the higher-level management device 200, and receive support for maintenance and replacement of the battery of the energy storage means 120 in the transport vehicle maintenance area (S690).

As described above, the present disclosure determines the lifespan of the battery of the energy storage means and repairs or replaces the battery having a lifespan equal to or less than a predetermined level, thereby maintaining the battery in an optimal state and thus improving the operating efficiency of the entire system.

According to the present disclosure as described above, the type and capacity of the energy storage means to be mounted are selected in consideration of the requirements of the article transport system and the state of related equipment. In particular, traveling of the article transport vehicle is controlled under a traveling condition corresponding to the mounted energy storage means, thereby improving the operating efficiency of the entire system. In addition, the output of the article transport vehicle is controlled in consideration of the mounted energy storage means, thereby achieving optimal power operation.

While exemplary embodiments of the present disclosure have been described, those skilled in the art will appreciate that various modifications, additions, and substitutions are possible, without departing from the scope and spirit of the present disclosure. Therefore, the embodiments disclosed in this specification are only for illustrative purposes rather than limiting the present disclosure. The scope of the present disclosure should be defined only by the accompanying claims, and all technical ideas within the scope of equivalents should be construed as falling within the scope of the present disclosure.

What is claimed is:

1. A method for operation of an article transport vehicle having an energy storage means, the method comprising:
 an energy storage means type determination step of determining a type of the energy storage means mounted in the article transport vehicle, wherein when it is impossible to determine the type of the energy storage means in the energy storage means type determination step, a determination result of the energy storage means type not being determined is reported to a higher-level management device, and a transport vehicle maintenance area for mounting the energy storage means is allocated to the article transport vehicle from the higher-level management device;
 a traveling condition information determination step of determining traveling condition information corresponding to the energy storage means mounted in the article transport vehicle among sets of traveling condition information which are differently set for each type of the energy storage means; and a traveling state control step of controlling a traveling state and power operation of the article transport vehicle on the basis of the traveling condition information, wherein the traveling state control step further comprises a charging step of performing charging through a rail while the article transport vehicle travels in a power feeding section on a travel route having the power feeding section and a non-power feeding section, wherein the charging step is performed by performing the charging according to charging condition information differently set on the basis of an output according to a weight of an article transported by the article transport vehicle, wherein the charging step comprises controlling a charging level of the energy storage means to be a low level in response to the weight of the article being equal to or higher than a predetermined level, wherein the low level is set to be lower than a charging level applied when the weight of the article being less than the predetermined level, and wherein the charging level corresponds to an intensity of a charging current when converting a static current supplied to the energy storage means into a variable current.

2. The method of claim 1, wherein the traveling condition information determination step comprises:

a step of determining a capacity of a capacitor included in the energy storage means; and a step of determining first traveling condition information, among the sets of traveling condition information, corresponding to the capacity of the capacitor, and wherein the traveling state control step is performed by controlling a maximum traveling speed, acceleration, and deceleration of the article transport vehicle on the basis of the first traveling condition information.

3. The method of claim 1, wherein the traveling condition information determination step comprises:

a step of measuring an amount of remaining energy in a battery included in the energy storage means; and a step of determining second traveling condition information, among the sets of traveling condition information, corresponding to the measured amount of the remaining energy, and wherein the traveling state control step is performed by controlling a maximum traveling speed, acceleration and deceleration of the article transport vehicle based on the second traveling condition information.

4. The method of claim 3, wherein the traveling state control step further comprises:

a non-power feeding section determination step of determining whether the article transport vehicle is expected to enter the non-power feeding section on the travel route having the power feeding section and the non-power feeding section; and a non-power feeding section entry determination step of determining whether to allow the article transport vehicle to enter the non-power feeding section on the basis of the measured amount of the remaining energy.

5. The method of claim 4, wherein the traveling state control step further comprises a preceding vehicle determination step of determining whether to allow the article transport vehicle to enter the non-power feeding section on the basis of whether a preceding article transport vehicle exists in the non-power feeding section on the travel route.

6. The method of claim 4, wherein the traveling state control step further comprises a charging maintenance step of maintaining charging in the power feeding section when it is determined that the article transport vehicle is not allowed to enter the non-power feeding section.

7. The method of claim 4, wherein the non-power feeding section entry determination step further comprises:

a step of reporting a non-entry situation to the higher-level management device when it is determined that the article transport vehicle is not allowed to enter the non-power feeding section; and a step of receiving a travel route changed to the power feeding section from the higher-level management device.

8. The method of claim 3, wherein the traveling state control step further comprises:

a maintenance area allocation step of comparing a lifespan of the battery with a reference value, reporting a battery replacement situation to the higher-level management device when it is necessary to replace the battery, and allocating the transport vehicle maintenance area from the higher-level management device; and a maintenance area route traveling step of traveling the article transport vehicle to the allocated transport vehicle maintenance area on the basis of traveling condition information set corresponding to the battery replacement situation.

9. The method of claim 3, wherein the charging step is performed by performing the charging according to charging condition information differently set on the basis of an output according to the traveling state of any one or more of traveling speed, acceleration, deceleration, and standby.

10. The method of claim 9, wherein the charging step is performed by measuring a temperature of a power receiving means of the article transport vehicle, and performing the charging on the basis of charging condition information differently set on the basis of a temperature range.

11. The method of claim 10, wherein the charging step is performed by comparing the measured temperature of the power receiving means of the article transport vehicle with a reference value or a threshold value, and controlling a charging current or stopping the charging.

12. An article transport system comprising:

an article transport vehicle having:

an energy storage means;

a power receiving means configured to receive power from a power feeding line of a rail;

a power supply means configured to supply the received power of the power receiving means to the energy storage means and provide energy stored in the energy storage means to a driving unit; and a control means configured to determine a type of the energy storage means, determine traveling condition information among sets of traveling condition information which are differently set for each type of the energy storage means, and control a traveling state of the article transport vehicle on the basis of traveling condition information corresponding to the energy storage means, wherein the control means is configured further to report, when it is impossible to determine the type of the energy storage means, a determination result of the energy storage means type not being determined to a higher-level management device, and a transport vehicle maintenance area for mounting the energy storage means is allocated to the article transport vehicle from the higher-level management device, wherein the control means is configured to control a charging level of the energy storage means to be a low level in response to a weight of an article transported by the article transport vehicle being equal to or higher than a predetermined level, wherein the low level is set to be lower than a charging level applied when the weight of the article being less than the predetermined level, and wherein the charging level corresponds to an intensity of a charging current when converting a static current supplied to the energy storage means into a variable current.

13. The article transport system of claim 12, wherein the control means comprises:

an energy storage means setting unit configured to determine the type of the energy storage means;

a traveling condition determination unit configured to retain the sets of traveling condition information, and determine traveling condition information, among the sets of traveling condition information, corresponding to the determined type of the energy storage means; and an operation state control unit configured to manage and control power operation for the energy storage means, and control the traveling state of the article transport vehicle on the basis of the traveling condition information.

14. The article transport system of claim 12, wherein the energy storage means comprises a capacitor, and wherein the control means controls the traveling state of the article transport vehicle on the basis of first traveling condition information, among the sets of traveling condition information, corresponding to a capacity of the capacitor of the energy storage means.

15. The article transport system of claim 12, wherein the energy storage means comprises a battery and a battery management unit configured to measure an amount of remaining energy and a lifespan of the battery and manage charging and discharging of the battery, and wherein the control means controls the traveling state of the article transport vehicle on the basis of second traveling condition information, among the sets of traveling condition information, corresponding to the amount of the remaining energy in the energy storage means.

16. The article transport system of claim 12, further comprising:

a rail network connecting a plurality of ports, including a power feeding section rail and a non-power feeding section rail, and configured to support traveling of the article transport vehicle, wherein the higher-level management device configured to issues a command to the article transport vehicle to transport an article and manage the traveling state of the article transport vehicle.

17. The article transport system of claim 16, wherein the higher-level management device sets a travel route on the basis of the traveling state of the article transport vehicle and provides the travel route to the article transport vehicle.

18. A method for operation of an article transport vehicle having an energy storage means, the method comprising:

an energy storage means type determination step of determining whether the type of the energy storage means mounted in the article transport vehicle is a capacitor or a battery, wherein when it is impossible to determine the type of the energy storage means in the energy storage means type determination step, a determination result of the energy storage means type not being determined to a higher-level management device, and a transport vehicle maintenance area for mounting the energy storage means is allocated to the article transport vehicle from the higher-level management device;

a traveling condition information determination step of determining traveling condition information, among sets of traveling condition information which are differently set for each type of the energy storage means, determining a capacity of the capacitor and determining traveling condition information corresponding thereto in the case of the capacitor, and determining an amount of remaining energy in the battery and determining traveling condition information corresponding thereto in the case of the battery; and a traveling state control step of controlling a traveling state and power operation of the article transport vehicle on the basis of the traveling condition information, wherein the traveling state control step is performed by:

determining whether to allow the article transport vehicle to enter a non-power feeding section on the basis of the amount of the remaining energy in the energy storage means comprising the battery or whether a preceding article transport vehicle exists; determining a lifespan of the battery, comparing the lifespan with a reference value, reporting a battery replacement situation to the higher-level management device when it is necessary to replace the battery, and allocated the transport vehicle maintenance area from the higher-level management device; and performing charging according to charging condition information differently set on the basis of (i) an output according to the traveling state in a power feeding section and (ii) a temperature according to reception of power through a rail, and (iii) a weight of an article transported by the article transport vehicle, wherein performing charging comprises controlling a charging level of the energy storage means to be a low level in response to a weight of an article transported by the article transport vehicle being equal to or higher than a predetermined level, wherein the low level is set to be lower than a charging level applied in response to the weight of the article being less than the predetermined level, and wherein the charging level corresponds to an intensity of a charging current when converting a static current supplied to the energy storage means into a variable current.

* * * * *